United States Patent
Taya et al.

(10) Patent No.: US 7,232,002 B2
(45) Date of Patent: Jun. 19, 2007

(54) APPARATUS FOR CONTROLLING RIGIDITY OF VEHICLE BODY

(75) Inventors: Minoru Taya, Seattle, WA (US); Taishi Wada, Seattle, WA (US); Shunji Suzuki, Saitama (JP); Yuta Urushiyama, Saitama (JP)

(73) Assignees: University of Washington, Seattle, WA (US); Honda Giken Kogyo Kabushiki Kaisha, Tokyo (JP)

(*) Notice: Subject to any disclaimer, the term of this patent is extended or adjusted under 35 U.S.C. 154(b) by 252 days.

(21) Appl. No.: 10/621,458

(22) Filed: Jul. 18, 2003

(65) Prior Publication Data

US 2005/0012317 A1    Jan. 20, 2005

(51) Int. Cl.
*B62D 21/15*    (2006.01)
(52) U.S. Cl. .............. 180/274; 280/784; 296/187.09; 293/117; 188/377
(58) Field of Classification Search ............ 296/187.1, 296/187.09, 187.03, 187.08; 293/4, 117, 293/102; 280/784; 188/371, 377; 180/274, 180/271

See application file for complete search history.

(56) References Cited

U.S. PATENT DOCUMENTS

| | | | | |
|---|---|---|---|---|
| 3,848,914 A | * | 11/1974 | Wathen | 293/9 |
| 4,050,537 A | * | 9/1977 | Bez | 180/274 |
| 4,518,183 A | * | 5/1985 | Lee | 293/118 |
| 5,106,137 A | * | 4/1992 | Curtis | 293/107 |
| 5,141,279 A | * | 8/1992 | Weller | 296/146.7 |
| 5,460,421 A | * | 10/1995 | Culbertson | 293/133 |
| 5,845,937 A | * | 12/1998 | Smith | 280/784 |
| 6,113,178 A | * | 9/2000 | Faigle | 296/187.06 |
| 6,286,895 B1 | * | 9/2001 | Urushiyama et al. | 296/187.03 |
| 6,334,639 B1 | * | 1/2002 | Vives et al. | 293/133 |
| 6,364,399 B1 | * | 4/2002 | Gibby | 296/187.06 |

FOREIGN PATENT DOCUMENTS

| | | |
|---|---|---|
| JP | 11-291951 | 10/1999 |
| JP | 2000-053020 | 2/2000 |

* cited by examiner

*Primary Examiner*—Ruth Ilan
(74) *Attorney, Agent, or Firm*—Arent Fox LLP

(57) ABSTRACT

An apparatus for controlling the rigidity of vehicle body according to the present invention comprises a controller for controlling a buckling form, which controls the buckling form by adding to a member to be inputted to a collision load a lateral force in the direction substantially perpendicular to the member.

13 Claims, 17 Drawing Sheets

A-A Cross-Section

Without Lateral Force

With Lateral Force

APPARATUS FOR CONTROLLING RIGIDITY OF VEHICLE BODY

FIELD OF THE INVENTION

The present invention is directed to an apparatus for controlling the rigidity of vehicle body. In a vehicle having a configuration of absorbing shock due to collision, the apparatus of the present invention can control the rigidity of vehicle body so as to obtain an adequate reaction load depending upon the form of the collision.

DESCRIPTION OF THE RELATED ART

As the conventional apparatus for controlling the rigidity of vehicle body, the apparatus is disclosed in Japanese Patent Laid-Open Publication No. 11-291951, in which by means of piezo-electric actuators placed on side frames provided on right and left sides of the vehicle, a force against collision load or a force which promotes the collision load is applied to the side frames, whereby the rigidity of the side frames is switched in order to meet the different form of the collision. Specifically, the apparatus has a configuration that in the case of fully lapped collision where the entire surface of the vehicle body is collided as a whole, the rigidity of the frame is reduced, while in the case of the offset collision where the collision load is focused on one side frame, the rigidity of one of the side frames should be increased, whereby optimal shock-absorbing can be done in both collision forms.

Due to the generation of the force against the collision load, i.e., the force directly receiving the collision load, through the piezo-electric actuators, the conventional configuration, however, requires a large amount of electric power for the actuation of the piezo-electric actuator. This enlarges the piezo-electric actuators themselves, and also leads to a large-sized battery for supplying power to the piezo-electric actuators.

Recently, in addition to switching the rigidity depending upon the collision forms such as fully lapped collision and offset collision, it has been strongly desired to control the reaction force giving to a subject depending upon the size of the subject by switching the rigidity of the vehicle body.

SUMMARY OF THE INVENTION

It is, therefore, an object of the present invention is to provide an apparatus for controlling the rigidity of vehicle body, which can control the rigidity of the vehicle body, which varies depending upon the collision forms, with small outputting. Another object of the present invention is to provide an apparatus for controlling the rigidity of vehicle body, which can control a reaction force depending upon the subjects to be collided with the vehicle body.

These and other objects can be attained by an apparatus for controlling the rigidity of vehicle body according to the present invention, which comprises a controller for controlling a buckling form, which controls the buckling form by adding to a member to be inputted to a collision load a lateral force in the direction substantially perpendicular to the member.

The term "buckling form" used herein means to include primary deformation mode having one antinode, secondary deformation mode having two antinodes, and a multiple deformation mode having a plurality of antinodes. As a number of antinodes is increased, the rigidity of the member buckled at such a deformation mode is increased. In the present invention, by restricting at least one portion which becomes an antinode when the member is buckled through a lateral force, the deformation mode is controlled to be switched into a multiple deformation mode.

According to the apparatus of the present invention, for example, side frames provided in the width direction of the vehicle are longitudinally divided and, the divided frames are connected to these members on which the apparatus of the present invention is provided. The apparatus of the present invention controls the buckling form by controlling a lateral force applied to a member to be inputted to a collision load in the direction substantially perpendicular to the member.

According to one preferred embodiment of the present invention, the member comprises hollow frame member, and the controller for controlling a buckling form comprises frame restrictors which are provided on at least one portion of said hollow member in the direction substantially perpendicular to said hollow member, and restrict the deformation of said frame member through the lateral force, and a restriction regulator which regulates the restriction state of said frame restrictors.

The term "hollow member" used herein means member produced into a hollow form and examples include, but are not limited to, bumpers, frames, pillars, and cross-members. Also included in the hollow members are two plates provided so as to make a space, and four rods provided so as to make a space.

According to another preferred embodiment of the present invention, said member comprises hollow frame member, and said controller for controlling a buckling form comprises frame restrictor which is inserted into said frame member in a movable manner, and restricts the deformation of said frame member through the lateral force, and a member for setting a position of said frame restrictor.

According to still another preferred embodiment of the present invention, the apparatus according to the present invention also has at least one collision detector, and controls the lateral force depending upon the evaluation based on the output from said detector.

In this embodiment, said controller for controlling a buckling form is preferably provided within a bumper, the collision detector preferably comprises at least one member selected from distance detector, speed sensor, and CCD camera. More preferably, the said collision detector comprises a plurality of distance sensors provided on a bumper.

According to still another preferred embodiment of the present invention, the buckling form is assumed to be buckling due to a primary deformation mode and buckling due to a secondary deformation mode, and ratio of the length L of said member to the thickness t of said member "L/T" is set so that the difference between the buckling load at the primary deformation mode and that at the secondary deformation mode is equal to or near the maximum value.

BRIEF DESCRIPTION OF THE DRAWINGS

In the drawings,

FIG. 7 shows the actuation of the apparatus for controlling the rigidity of vehicle body of FIG. 1, wherein

FIG. 12 is a cross-sectional view of the lateral force generator, where

DESCRIPTION OF PREFERRED EMBODIMENTS

The apparatus for controlling the rigidity of vehicle body according to the present invention will now be described by referring to the attached drawings.

First Embodiment

First, the first embodiment of the apparatus for controlling the rigidity of vehicle body according to the present invention will be described referring to FIGS. 1 to 6.

Figure 1:
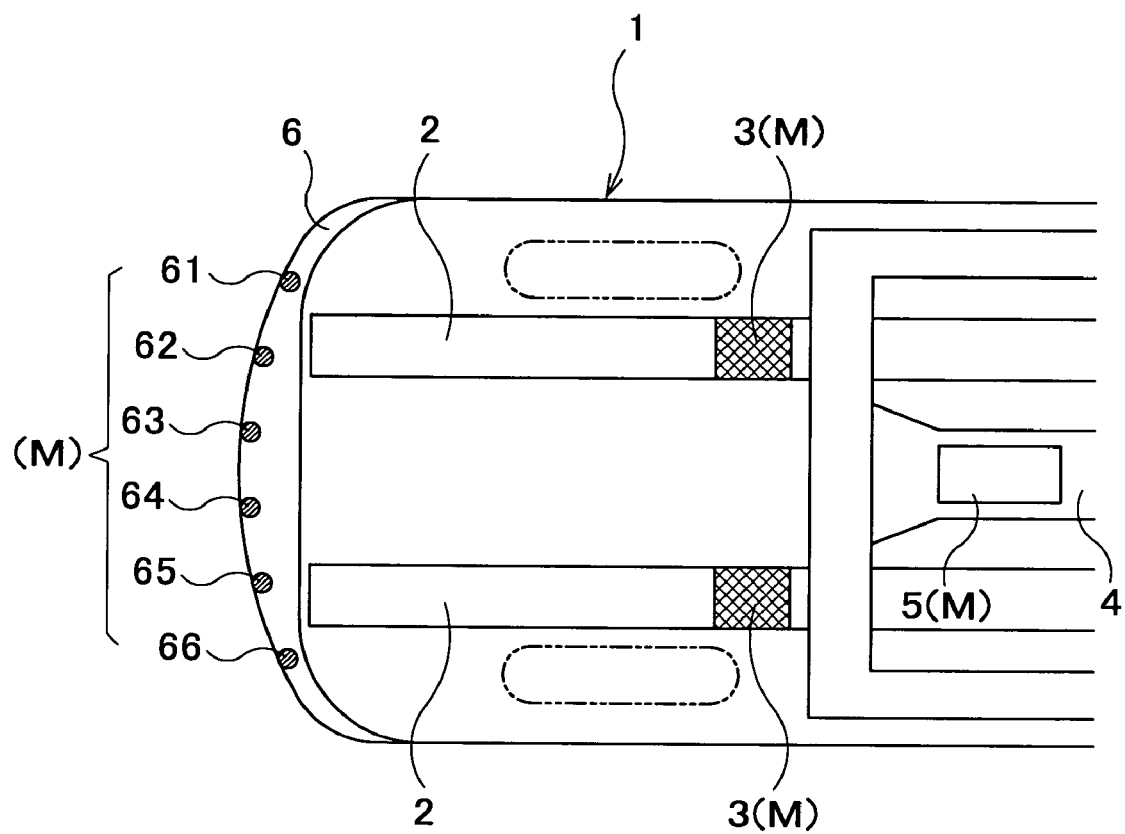
FIG. 1 is a plan view illustrating an apparatus for controlling the rigidity of vehicle body according to an embodiment of the present invention.

As shown in FIG. 1, apparatus M for controlling the rigidity of vehicle body according to the first embodiment of the present invention (hereinafter simply referred to as "apparatus") mainly comprises lateral force generators 3, 3, provided on right and left side frames 2, 2 extending toward the longitudinal direction of vehicle 1, and a control device 5 provided on center frame 4 placed near the center of vehicle 1. Further, apparatus M possesses distance sensors 61-66 (each serving as detection of collision) placed within front bumper 6.

Figure 2:
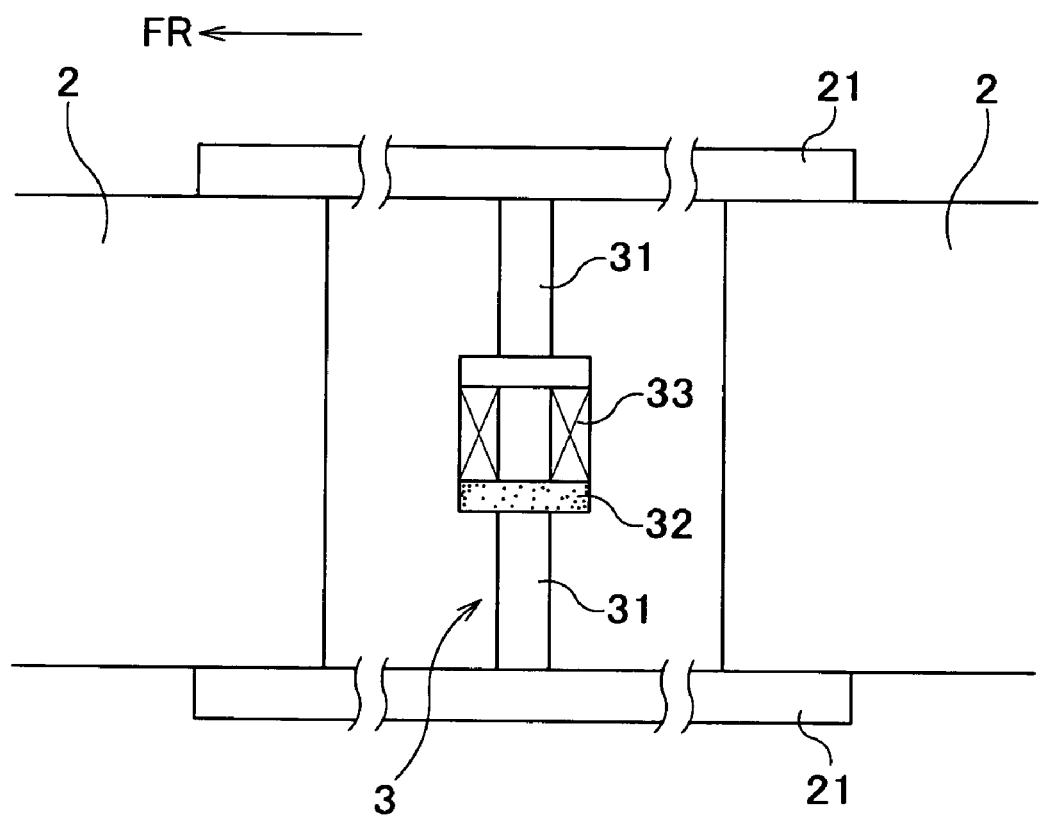
FIG. 2 is a cross-sectional view showing a lateral force generator of the apparatus of FIG. 1.

As shown in FIG. 2, lateral force generators 3 are placed in between a pair of plates 21, 21 (hollow members) which bind side frames having being divided into two pieces in the longitudinal direction to each other. Each of lateral force generators 3 mainly comprises supporting rods 31, 31 (frame restrictions), permanent magnet 32 provided on the tip of one of supporting rods 31, 31, and electromagnet 33 (restriction controller) provide on the tip of another end of one supporting rods 31, 31. By controlling power supplied to electromagnet through controller 5, a lateral force (absorbing force) substantially perpendicular to side frame 2 and plate 21 is controlled.

Figure 3:
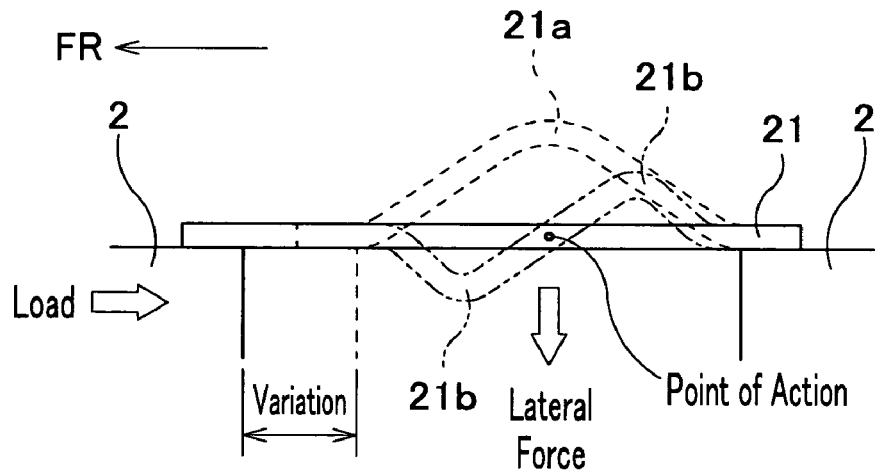
FIG. 3 is a partially enlarged view showing the buckling state of plate of FIG. 2.

As shown in FIG. 3, plate 21 buckles in a primary deformation mode having one antinode 21a, when a collision load is inputted at a time which lateral force greater than a given value is not applied from lateral generator 3. Plate 21 buckles in a secondary (multiple) deformation mode having two (multiple) antinodes 21b, 21b, when a collision load is inputted at a time which lateral force greater than a given value is applied from lateral generator 3. Specifically, the buckling form of this plate 21 can be switched from the primary deformation mode into the secondary deformation mode by restricting substantially the central portion of the antinode 21a of the primary deformation mode (the point of the action) by means of the lateral force from lateral force generator 3.

Figure 4:
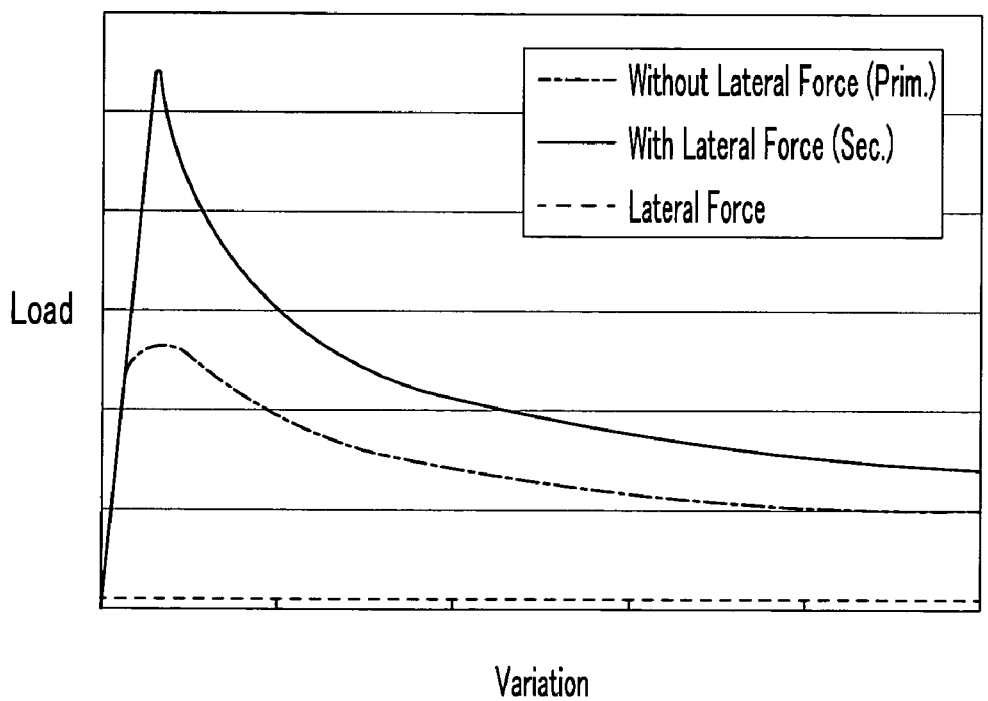
FIG. 4 shows one characteristic of buckling load of the plate in one buckling form of FIG. 3.

As shown in FIG. 4, there is a characteristic that the load (buckling load) against collision load in the case of buckling in the secondary deformation mode is higher than that in the case of the buckling in the primary deformation mode. Particularly, comparing the peak values generated immediately after collision load is inputted, the difference between two modes is significant, which is approximately twice. From this, it can be understood that the rigidity can be controlled over a wide range by switching the deformation mode from the primary deformation mode into the secondary deformation mode or vice versa. The lateral force by lateral force generator 3 is very small in comparison with these loads. The artisan will prove that by applying only such a very small lateral force, the primary deformation mode can be switched into the secondary deformation mode, whose load is twice that of the primary deformation mode. Apparatus M makes use of such a buckling characteristic possessed by plate 21, and controls a small lateral force generated from lateral force generator 3 by controller 5, whereby the buckling mode of plate 21 is controlled to control the rigidity thereof within a wide range.

Figure 5:
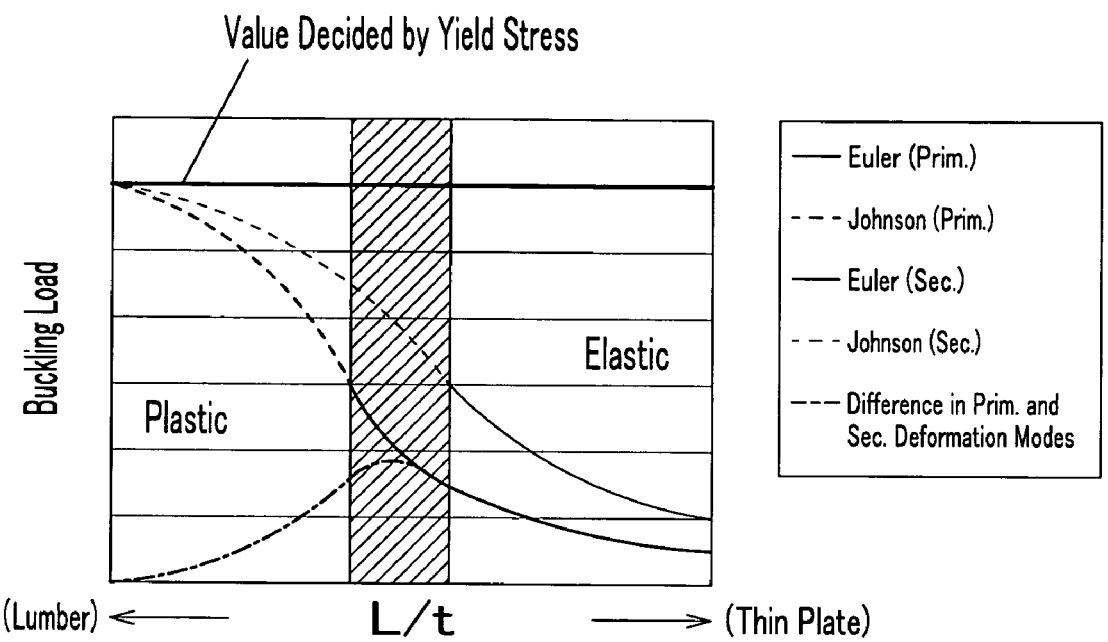
FIG. 5 shows another characteristic of buckling load of the plate in another buckling form of FIG. 3.

Furthermore, as shown in FIG. 5, the buckling mode of plate 21 has a specific relation to the ratio of length L to thickness T of plate 21 (herein after abbreviated as "L/T ratio"). Specifically, both in the primary deformation mode and the secondary deformation mode, there is a tendency that the buckling load is increased as an L/t ratio becomes small, and the buckling load is decreased as it becomes large. Also, both the primary deformation mode and the secondary deformation modes exhibit plastic buckling at an L/t ratio lower than a given value, and exhibit elastic buckling at an L/t ratio greater than a given value. Here it should be noted that the buckling load in the plastic buckling would be calculated according to Johnson's equation, whereas the buckling load in the elastic buckling would be calculated according to Euler's equation. The difference between the buckling loads of the secondary deformation mode and the primary deformation mode becomes maximum around a shaded portion depicted on FIG. 5 (where the buckling load becomes plastic buckling in the secondary deformation mode and it becomes elastic buckling in the primary deformation mode). Plate 21 used in this embodiment has such an L/t ratio to have the maximum difference and, thus, the rigidity range of plate 21 can be switched over a wide range. The L/t ratio having the maximum difference depends upon the material to be used. For example, the L/t ratio having the maximum difference is 50 for aluminum and 100 for iron.

It should be noted that the use of plate 21 having an L/t ratio with the maximum difference in buckling load is not essential in the present invention, and the L/t ratio may be freely selected. For example, plate 21 used may have an L/t ratio slightly smaller than that shown as shaded portion in FIG. 5. In this case, although the difference in the buckling load between the secondary deformation mode and the primary deformation mode is slightly smaller than plate 21 having the L/t ratio within the shaded portion, the buckling loads themselves may be advantageously increased.

Figure 6:
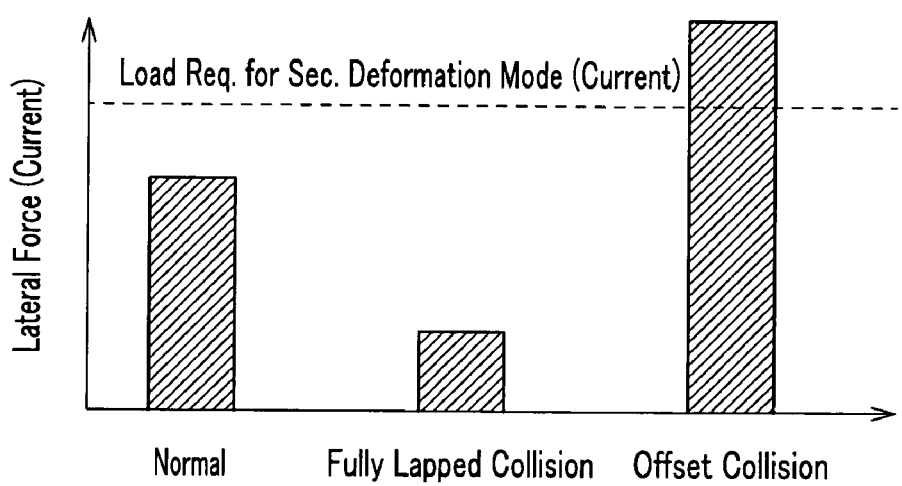
FIG. 6 is a graph showing the relation between a collision form and a lateral force.

As shown in FIG. 1, controllers detects the collision form on the basis of the outputs from distance sensors 61-66, and controls the current supplied to electromagnet 33 of lateral force generator 3 depending upon the detected collision form. Distance sensors 61-66 detect the collision form. Specifically, they detect the distance to the collided subject using laser or ultrasonic wave. If the outputted values from all of distance sensors 61-66 are judged to be lower than a given value by controller 5, the controller 5 judges that the collision form is fully lapped collision. If the outputted value from at least one distance sensor 61-63 at the right side of the vehicle or at least one distance sensor 64-66 is judged to be lower than a given value by controller 5, the controller 5 judges that the collision form is offset collision. As shown in FIG. 6, when judged to be the fully lapped collision, controller 5 gives current lower than that running through electromagnet 33 at a usual state to electromagnet 33. When judged to be the offset collision, controller 5 gives electromagnet a current required for switching the mode into the secondary deformation mode. By controlling the current as described above, the pair of plates 21, 21 are fixed through the lateral force acted towards the direction that they are attracted. At the time of fully lapped collision, the lateral force becomes lower than a given value, whereby each plate 21 becomes easily buckled in the primary deformation mode. At the time of offset collision, the lateral force becomes higher than the given value, whereby each plate 21 is buckled in the secondary deformation mode.

The control of the current given to electromagnet 33 should not be restricted to the control as described, and any control may be performed. For example, when controller 5 judged to be the fully lapped collision, controller may give electromagnet 33 current in the reverse direction to that at the usual time and at the time of the offset collision. In this case, since a lateral force acted on the pair of plates 21, 21 in the direction that they are repelled at the time of the fully lapped collision, this lateral force motivates the opportunity that these plates 21, 21 are positively deformed in a prescribed direction. Also, it is possible that the controller 5 gives current to electromagnet 33 only when it judges to be the offset collision. Specifically, the controller 5 may control ON/OFF of electromagnet to switch the mode, i.e., from the primary deformation mode to the secondary deformation mode or vice versa.

Next, the operation of apparatus M will be described by referring to FIGS. 1, 2, and 7.

First, referring to FIG. 1, the case will be described where vehicle 1 is collided in a fully lapped manner.

Figure 7A:
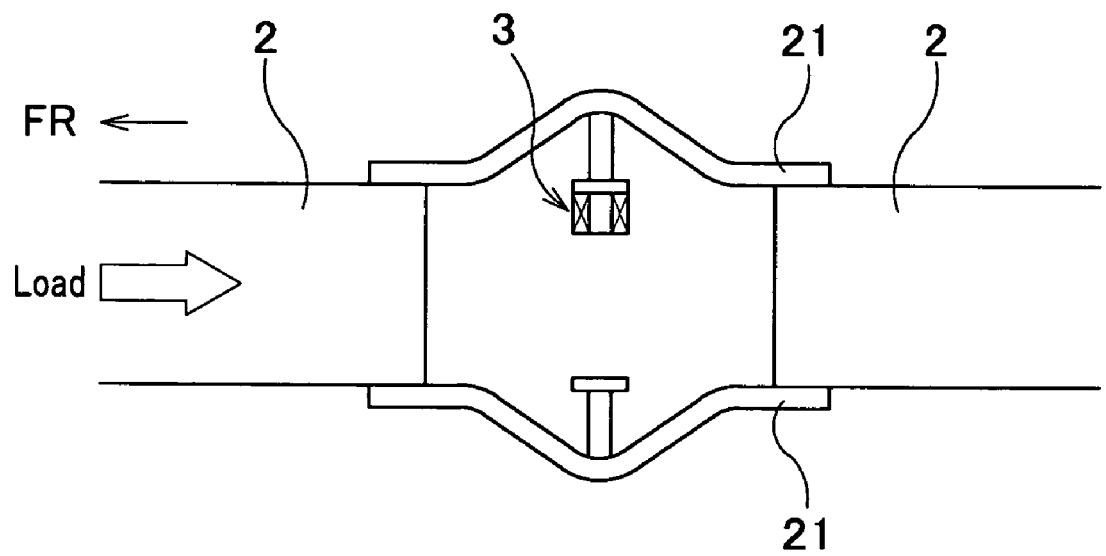
FIG. 7A shows the actuation of the apparatus in the case of fully lapped collision.

If vehicle 1 will be collided with a subject in a fully lapped manner, the signals detected from distance sensors 61-66 are outputted to controller 5. Controller 5 judges that all the outputted values are less than a given value and then judges to be fully lapped collision. Controller 5, which has judged to be fully lapped collision as described above, decreases the current running through electromagnet 33 (see FIG. 2) to thereby make the lateral force generated from lateral force generator 3 smaller than the usual case. Upon the fully lapped collision of vehicle 1, each of plate 21 is buckled in the primary deformation mode in the direction that plates 21, 21 are repelled to each other without any restriction as shown in FIG. 7A.

Figure 7B:
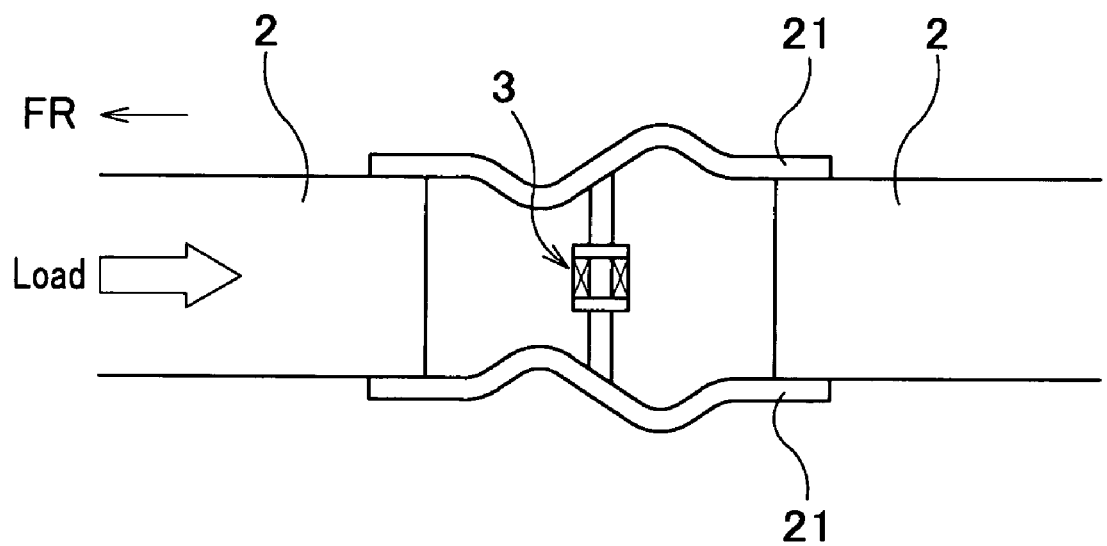
FIG. 7B shows the actuation of the apparatus in the case of offset collision.

Next, referring to FIG. 1, the case will be described where vehicle 1 is collided in an offset manner. If vehicle 1 will be collided with a subject in an offset manner, for example at the right side, the signals detected from distance sensors 61-63 at the right side are outputted to controller 5. Controller 5 then judges that the outputted values are lower than a given value, and judges to be offset collision. Controller 5, which has judged to be offset collision as described above, increases the current running through electromagnet 33 (see FIG. 2) to thereby make the lateral force generated from lateral force generator 3 larger than the usual case. Upon the offset collision of vehicle 1, plates 21, 21 are restricted to be buckled in the secondary deformation mode as shown in FIG. 7B.

As described above, the flowing advantages can be exhibited according to the first embodiment of the present invention:

Since apparatus controls a lateral force which is substantially perpendicular to the member (in this case, side frame 2 and plate 21), i.e., only restricts a part of antinode 21a in the primary deformation mode, whereby the rigidity of plate 21 can be controlled, apparatus M can control the rigidity of side frames only by a force smaller than the force against the collision load as in the prior art. Consequently, the size of the apparatus and battery or such for supplying power to the apparatus can be decreased.

Since the lateral force is controlled on the basis of the signals indicating the collision form detected from distance sensors 61-66, the rigidity of plate 21 can be freely controlled depending upon the collision form.

While controller the collision form is judged only based on the outputted valued from distance sensors 61-66, the present invention is not restricted thereto. For example, speed sensor or such may be provided in addition to these distance sensors. In the configuration where speed sensor is provided, as lateral force generator 3 is not controlled at the time of driving vehicle 1 at a low speed as in the case of putting the vehicle in a garage, the cost for requiring the power consumption can be reduced. Also, sensor may be configured so that an image is inputted from CCD camera or other image capturing means to judge the collision form and whether or not vehicle is collided.

Figure 8A:
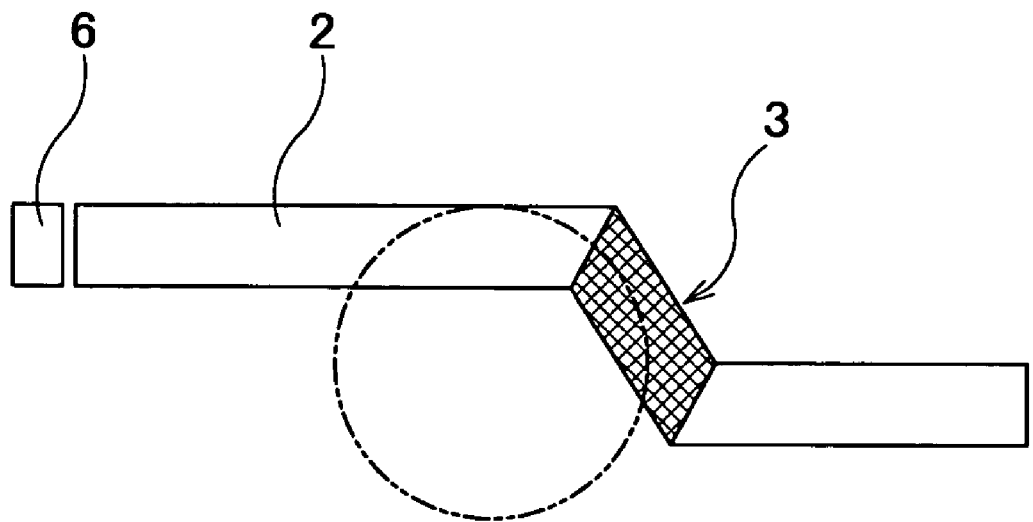
FIG. 8A is a side view showing the situation where the lateral force generator of FIG. 2 is provided on upper and lower portion of side frames at the bent portions.
Figure 8B:
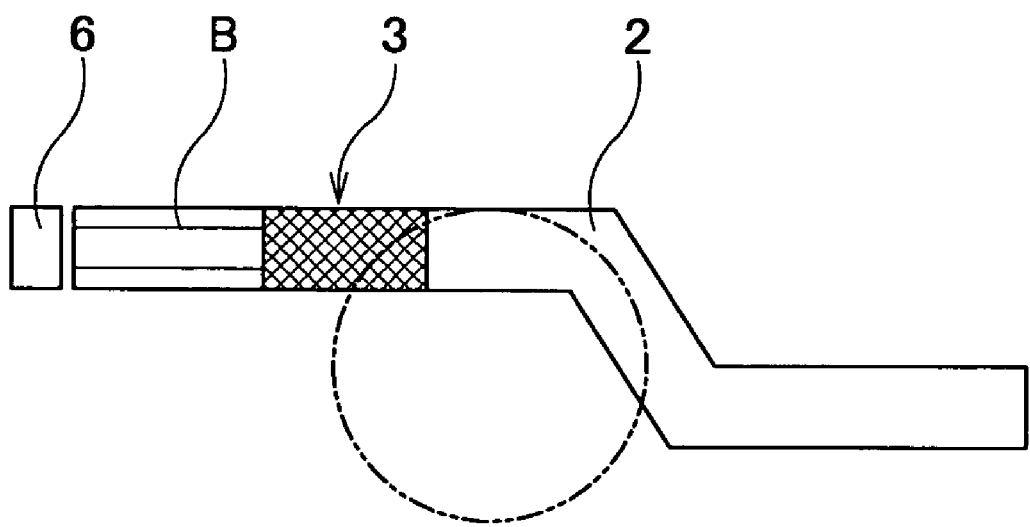
FIG. 8B is a side view showing the situation where the lateral force generator of FIG. 2 is provided on a rear side of the crush box.

The pair of plates 21, 21 and lateral force generators 3 may be disposed anywhere. For example, they can be placed on side frame 2 at the vertically bent portion as shown in FIG. 8A (the position according to the first embodiment), or on a portion behind crush box 8 for absorbing the collision load as shown in FIG. 8B.

Figure 9:
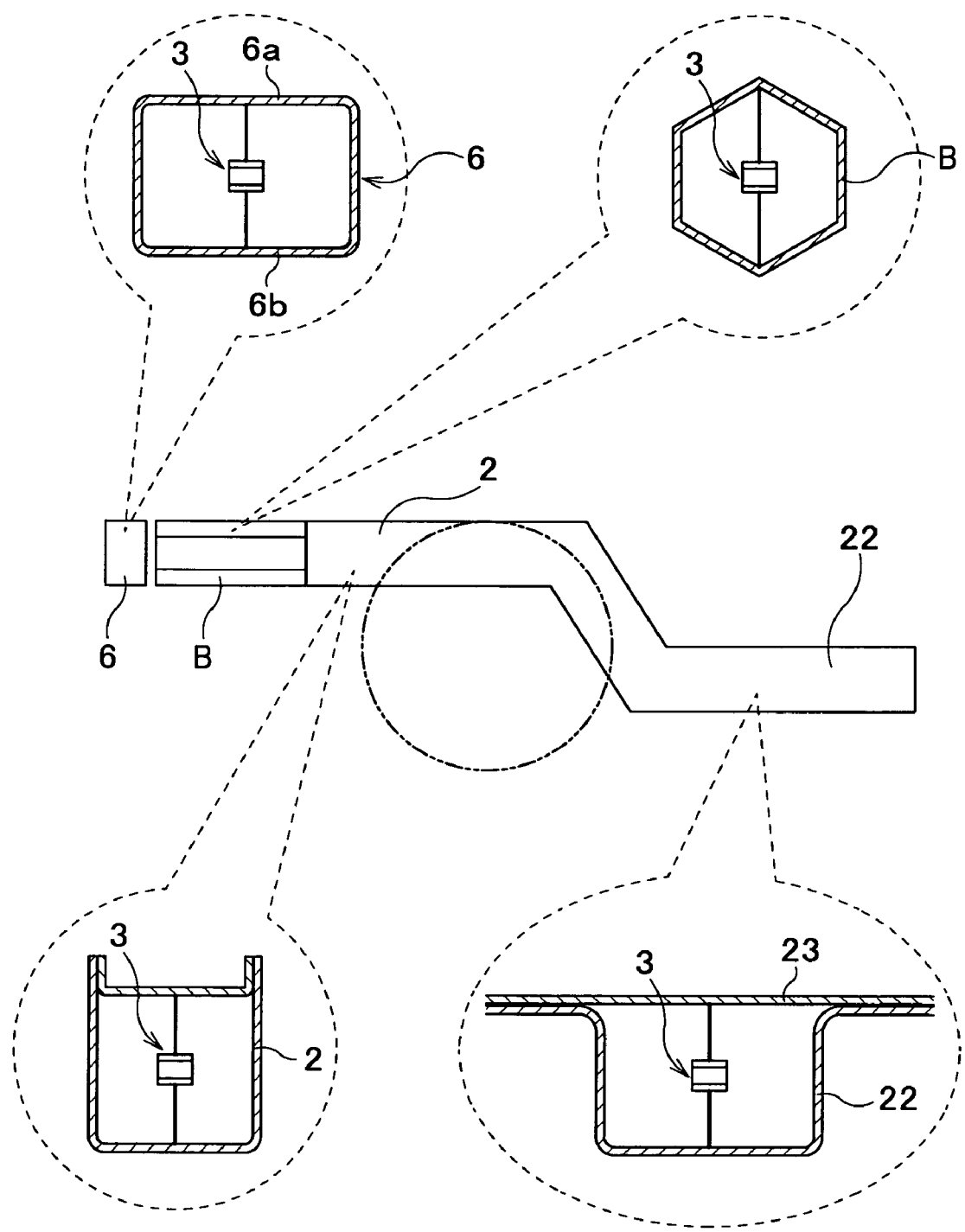
FIG. 9 is a side and cross-sectional views side totally showing another embodiment of the lateral force generator of FIG. 2.
Figure 10A:
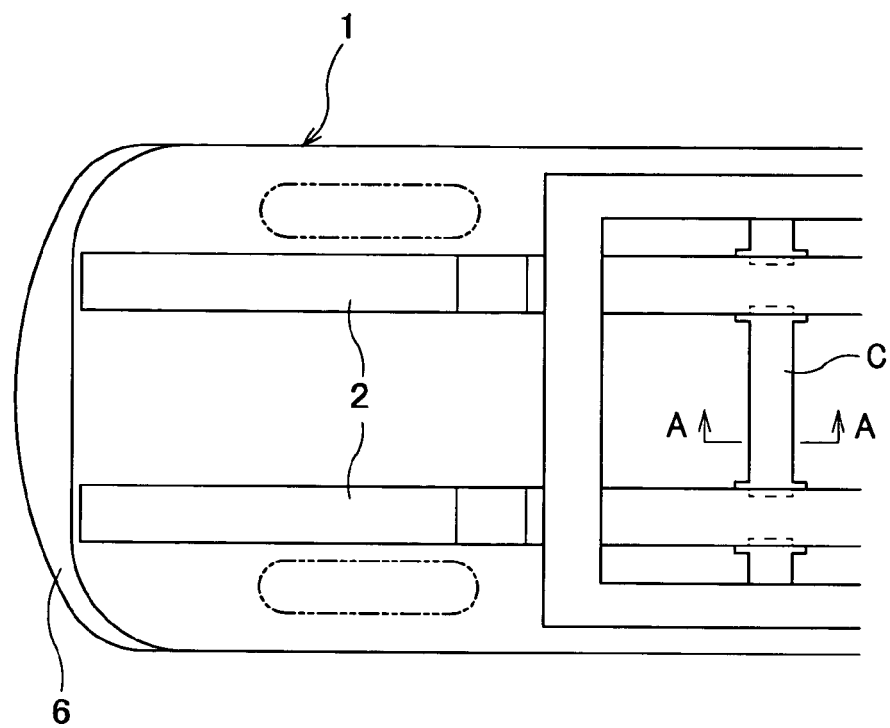
FIG. 10A is a plane view totally showing still another embodiment of the lateral force generator of FIG. 2.
Figure 10B:
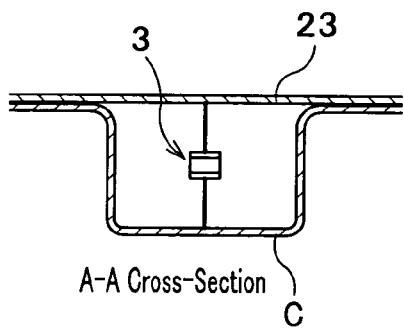
FIG. 10B is a partially enlarged cross-sectional view showing the lateral force of FIG. 10A applied to a cross member.
Figure 10C:
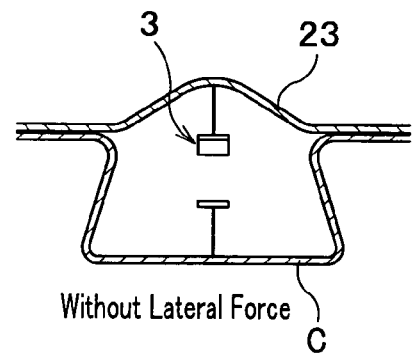
FIG. 10C is a partially enlarged cross-sectional view showing the situation where no lateral force is applied at the time of collision.
Figure 10D:
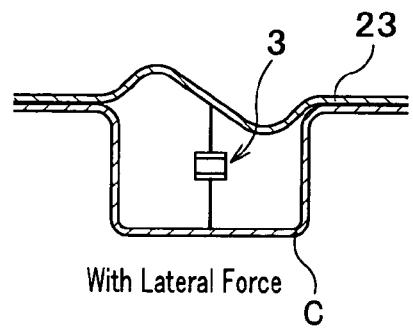
FIG. 10D is a partially enlarged cross-sectional view showing the situation where lateral force is applied at the time of collision.

While plate 21 is used as the subject to control the rigidity by apparatus M, the subject is not restricted thereto. For example, the rigidity of the panel of vehicle body can be directly controlled. For example, as shown in FIG. 9, the subject may be provided within front bumper 6, within crush box B, side frame 2 or in between floor frame 22 formed at portion one step below the side frame 2 and floor panel 23 which is conjugated with floor frame 22. This makes it possible to control the crushing ability of front bumper 6 and that of crush box B, as well as to control the rigidity of side frame. Also, as shown in FIGS. 10A and 10B, lateral force generator 3 may be provided in between cross member C and floor panel 23, which is conjugated with cross member C. Buckling of this lateral force generator 3 in the primary or secondary deformation mode can control the rigidity of floor panel 23 (see FIGS. 10C and 10D). In the case where lateral force generator 3 is provided in between cross member C and floor panel 23, since the rigidity of cross member C is higher than floor panel 23, this lateral force generator 3 is used only for the purpose of controlling the rigidity of floor panel 23. Other places for providing lateral force generator include pillar and rear bumper.

Also, as shown in FIG. 9, in the case where lateral force generator 3 is provided in between upper wall 6a and lower wall 6b making up front bumper 6, distance sensors 61-66 described in the first embodiment is used for detecting a subject, whereby the rigidity of front bumper 6 can be changed depending upon the size of the subject. Specifically, for example, only two of six distance sensors 61-66 output signals, controller 5 judges that the subject is small and makes the rigidity of front bumper small. Conversely, if three or more of distance sensors 61-66 output signals, controller 5 judges that the subject is large and makes the rigidity of front bumper large. For this reason, for example, the vehicle body is collided with an electric or telephone pole or such, which is a small subject, then the impact to the pole or such can be reduced. Conversely, if the vehicle body is collided with a big subject such as a big car, the rigidity of the vehicle body can be enhanced. It is also possible to predict the collision and then control the rigidity of vehicle body.

Second Embodiment

A second embodiment of the apparatus for controlling the rigidity of vehicle body according to the present invention will now be described. The second embodiment is a variation of the first embodiment in which lateral force generator 3 in the first embodiment is modified. Consequently, the same parts and elements as those in the first embodiment are referred to the same numbers or symbols and the detailed description thereof will be omitted.

Figure 11:
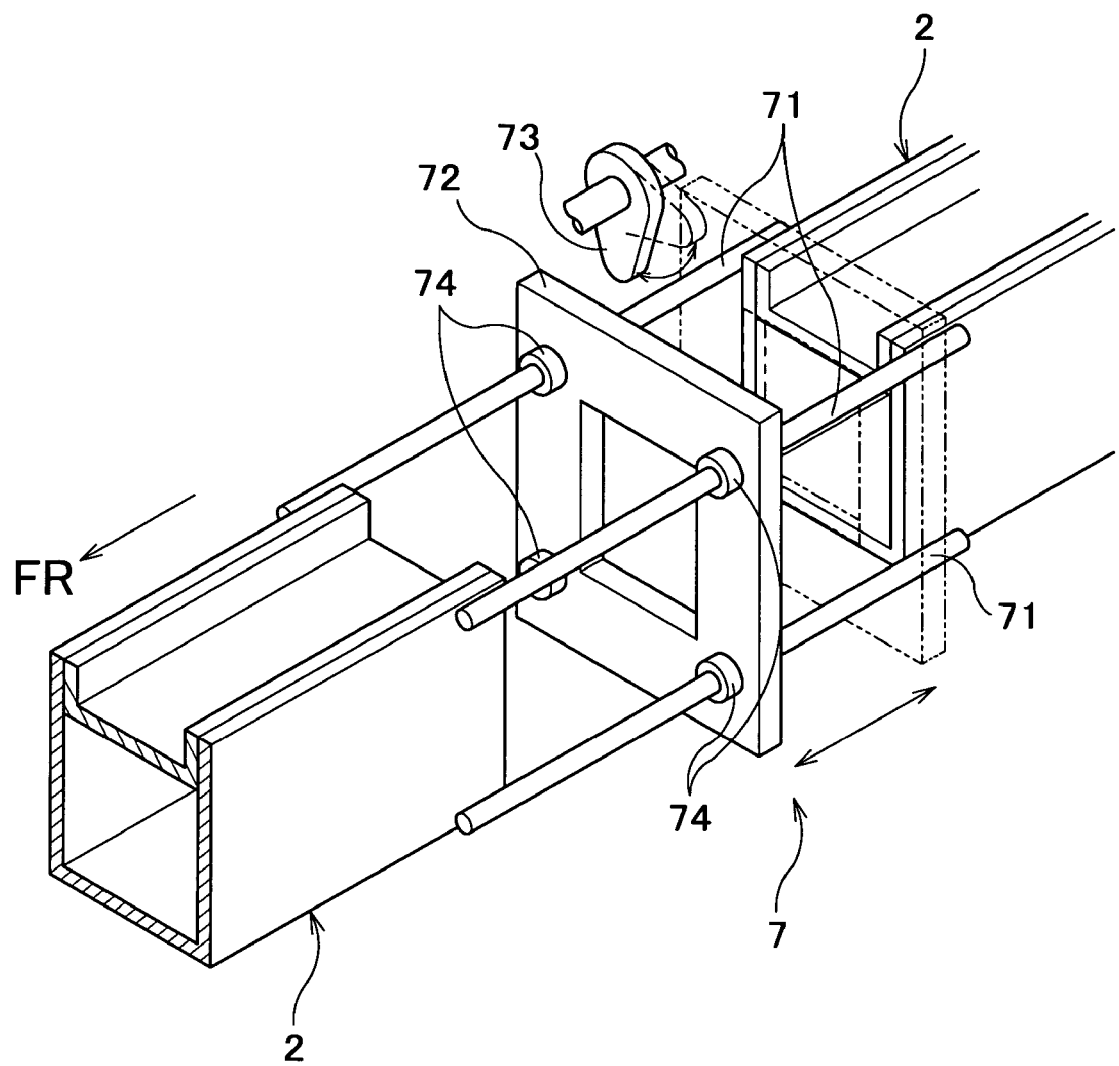
FIG. 11 is a perspective view showing a lateral force generator according to a second embodiment.

As shown in FIG. 11, lateral force generator 7 according to this embodiment mainly comprises four rods 71, . . . (hollow frames), which bind longitudinally divided side frames 2, and ring 72 (for frame restriction), which is slidably fitted to these rods 71, . . . . Regulation lever 73 (for setting the restriction position) is rotatably fit to the vehicle body (not shown). Regulation lever 73 rotates only when a signal indicates offset collision outputted from controller 5 to release the regulation. Stopper 74 for regulating the movement of each rod 71 (which sets the restriction position) is provided on an approximately center of each rod 71.

Next, the operation of apparatus M will be described by referring to FIG. 12.

Figure 12A:
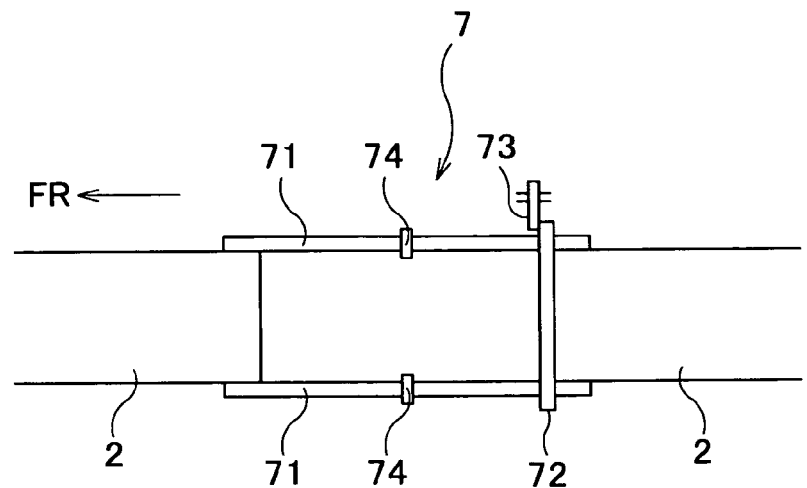
FIG. 12A shows a normal state.
Figure 12B:
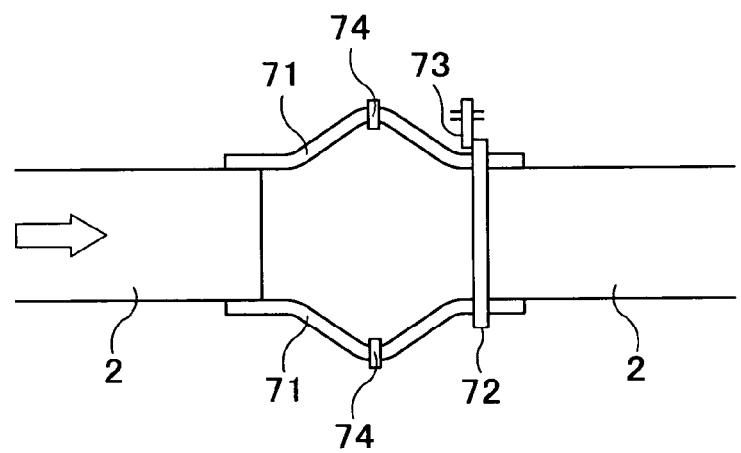
FIG. 12B shows the state at fully lapped collision.
Figure 12C:
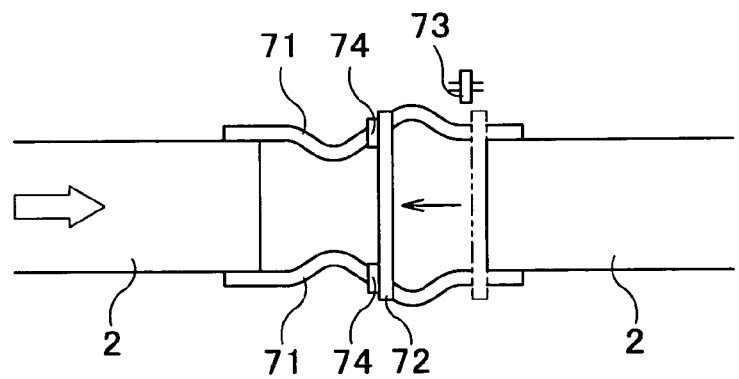
FIG. 12C shows the state of offset collision.

As shown in FIG. 12A, at a normal driving state, ring 72 whose forward movement is always regulated by regulation lever 73, remains unmoved even if inertia is acted on ring to go forwards due to stepping-in the break etc. At the time of collision, when the collision form detected by distance sensors 61-66 is fully lapped collision, as shown in FIG. 12B, in the state where regulation lever 73 fastens ring 72 at a rear side of rod 71, rod 71 is buckled in the primary mode. When the collision form is offset collision, as shown in FIG. 12C, ring 72, from which the regulation by regulation lever 73 is released, moves forward due to the inertia generated at the time of the collision, and stops at the portion of stopper 74. As described above, ring 72 is positioned at approximately center of rod 71, whereby rod 71, whose central portion is restricted by ring 72, is buckled in the secondary mode.

As described above, according to the second embodiment of the present invention, the following advantages can be obtained.

In the second embodiment, which uses inertia acted upon ring 72 at the time of collision, only the control, which can revolves regulation lever 73, is required only in the case of offset collision. Accordingly, cost due to power consumption can be reduced in comparison with the first embodiment.

Third Embodiment

A third embodiment of the apparatus for controlling the rigidity of vehicle body according to the present invention will now be described. The third embodiment is a variation of the first embodiment in which lateral force generator 3 in the first embodiment is modified. Consequently, the same parts and elements as those in the first embodiment are referred to the same numbers or symbols and the detailed description thereof will be omitted.

Figure 13A:
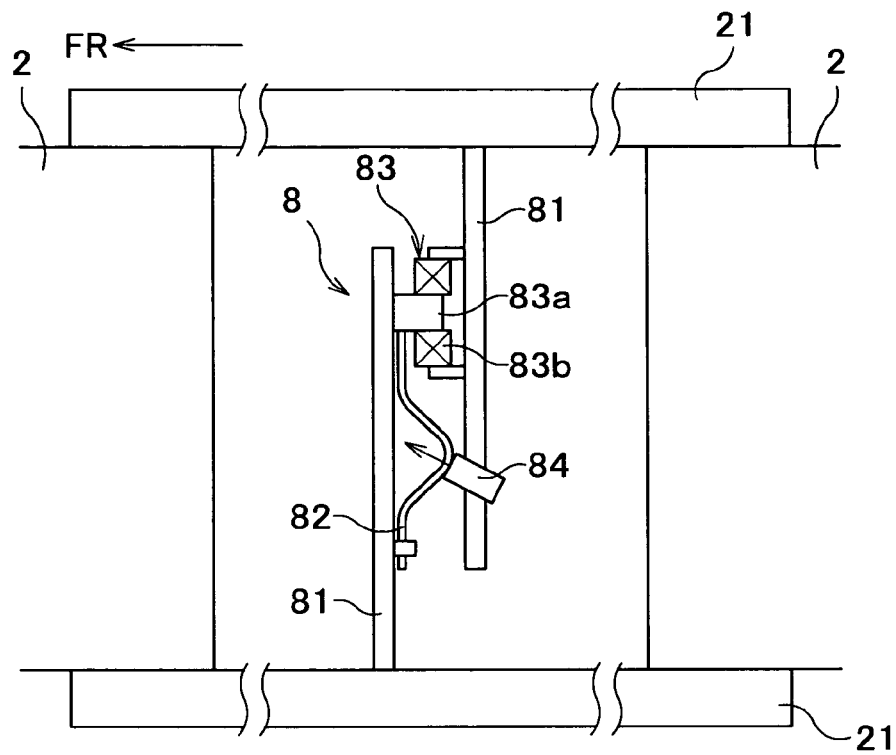
FIG. 13A is a cross-sectional view showing a lateral force generator according to a third embodiment at a normal state and at the state of offset collision.

As shown in FIG. 13A, lateral force generator 8 is provided in between a pair of plates 21, 21, which bind vertically divided side frames 2 with each other, as in the first embodiment. This lateral force generator 8 mainly comprises supporting plates 81, 81, which are bonded to the pair of plates 21, 21, and placed with being shifted to each other in the longitudinal direction, super elastic alloy 82 disposed between these supporting plates 81, 81, and drive switch 83. Super elastic alloy 82 serves as a plate spring, one end of which is fixed on the front side supporting plate 82, and the other end being communicated with stopper 83a possessed by drive switch 83 in the state that center of super elastic alloy 82 is bent. Stopper 83a has a configuration that it can freely move forwards and backwards by solenoid 83b, which generates a magnetic power upon supplying power, and it moves backwards only when controller 5 outputs a signal indicating fully lapped collision (see FIG. 13B). Connecting pin 84 for connecting two supporting plates 81, 81 with each other is conjugated with super elastic alloy 82 at the center thereof. Connecting pin 84 is tilted relative to the rear side supporting plate 81 so that the axis direction thereof is along with the direction that connecting pin 84 comes off.

Next, the operation of apparatus M will be described by referring to FIG. 13.

Figure 13B:
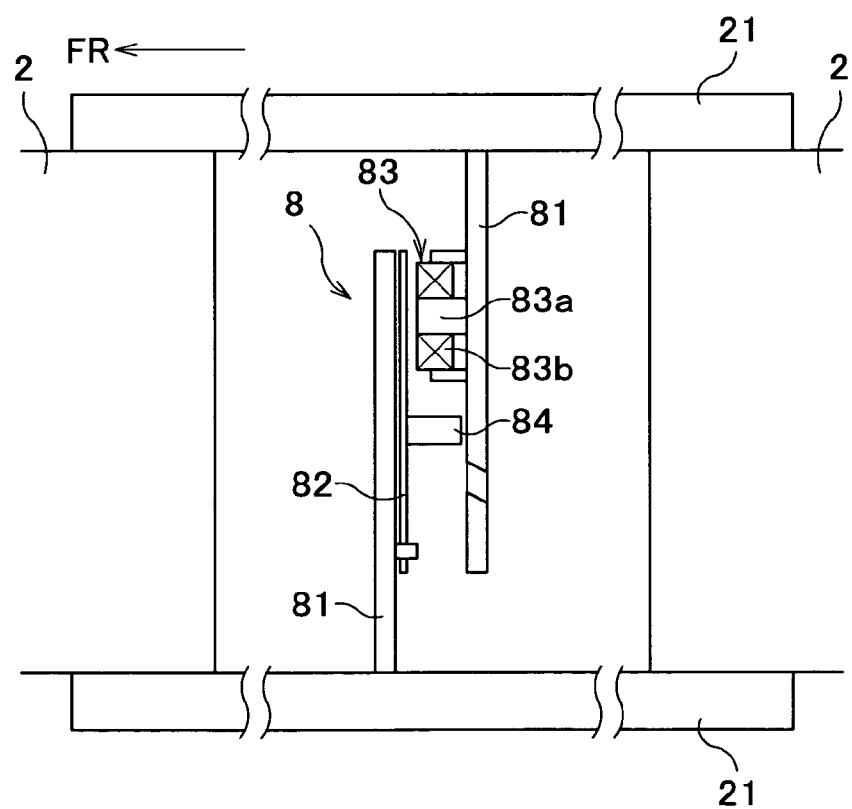
FIG. 13B is a cross-sectional view showing a lateral force generator according to a third embodiment at the state of fully lapped collision.

As shown in FIG. 13A, at the time of a normal driving state, the other end of super elastic alloy 82 is suppressed by stopper 83a, whereby two supporting plates 81, 81 are connected to each other via connecting pin 84. In the case where the collision form is offset collision, lateral force generator 8 keeps the as is state, whereby the center portion of each plate 21 is restricted to buckle each plate 21 at the secondary deformation mode. In the case where the collision form is fully lapped collision, as shown in FIG. 13B, stopper 83a moves backwards, whereby super elastic alloy 82, which has been suppressed in the bent state, is returned into its original state and connecting pin 84 comes off. For this reason, the center portion of each plate 21 is not restricted and, thus, each plate 21 is buckled in the primary mode.

As described above, according to the second embodiment of the present invention, the following advantages can be obtained.

In the second embodiment, which uses the force that super elastic alloy 82 is returned into the original state, a current in a given direction is run through solenoid 83 only in the case of fully lapped collision. Accordingly, cost due to power consumption can be reduced in comparison with the first embodiment.

Fourth Embodiment

A fourth embodiment of the apparatus for controlling the rigidity of vehicle body according to the present invention will now be described. The fourth embodiment is a variation of the first embodiment in which lateral force generator 3 in the first embodiment is modified. Consequently, the same parts and elements as those in the first embodiment are referred to the same numbers or symbols and the detailed description thereof will be omitted.

Figure 14:
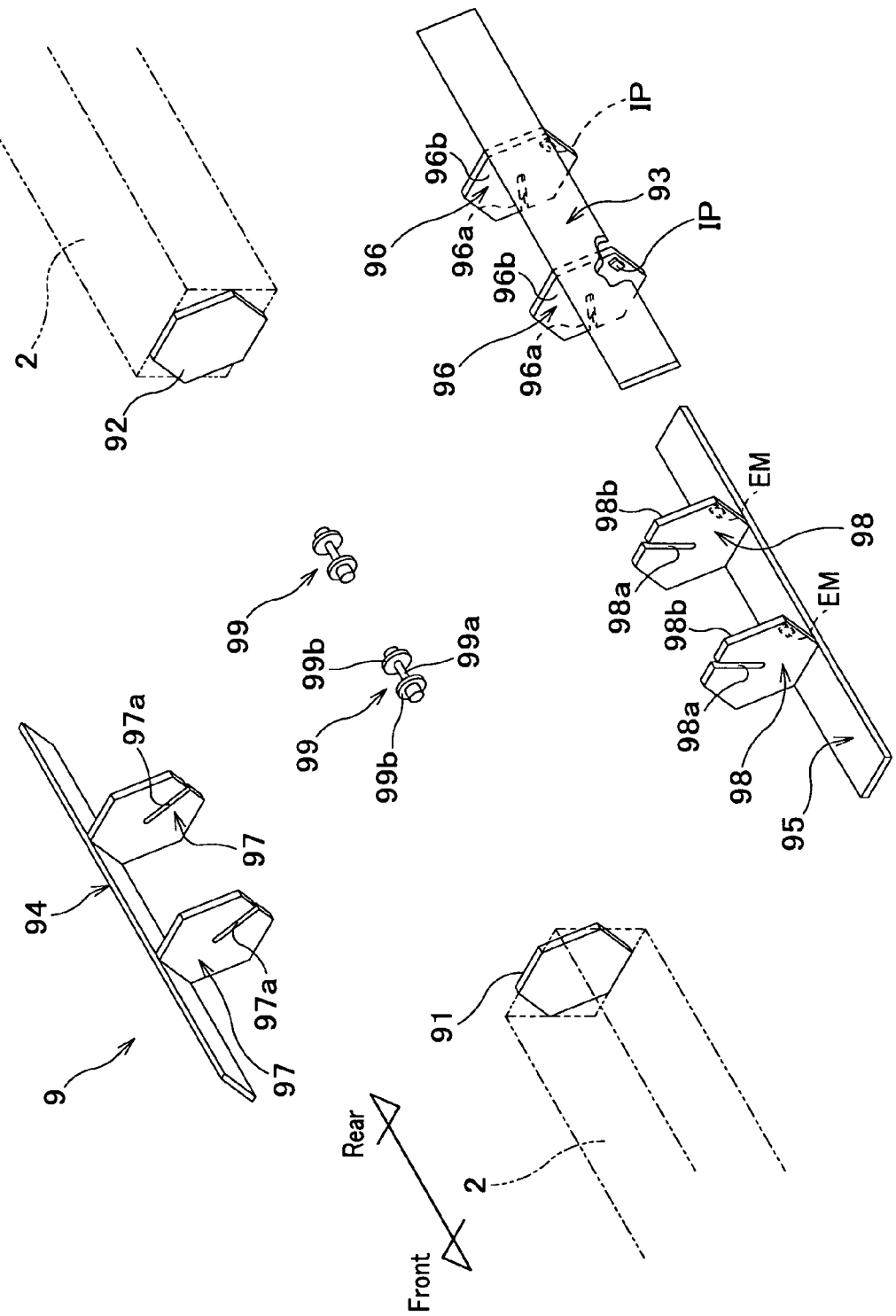
FIG. 14 is a perspective view showing a lateral force generator according to a fourth embodiment.

As shown in FIG. 14, lateral force generator 9 is provided in between a pair of vertically divided side frames 2, as in the first embodiment. Lateral force generator 9 is mainly composed of front side mounting portion 91, which is connected to front side frame 2, rear side mounting portion 92, which is connected to rear side frame 2, first plate 93 and second plate 94, both ends of which are connected to these mounting portions 91, and 92, respectively, and third plate 95. Furthermore, lateral force generator 9 has a pair of first sliding members 96, 96, a pair of second sliding members 97, 97, and a pair of third sliding member 98, 98, which are connected to first plate 93, second plate 94, and third plate 95, respectively, as well as guide members 99, 99, which are engaged with these sliding members 96, 97, and 98, in a slidable manner. For convenience of description, FIG. 14 shows first plate 93 in the state where a part of first plate 93 is broken.

Front mounting part 91 and rear mounting part 92 are plates each having approximately hexagonal shape viewing from upside, and three plates 93, 94, and 95 are connected to the ends of mounting portions 91 and 92 every other sides. Specifically, a prescribed distance is provided between plates 93, 94, and 95.

Sliding members 96, 97, and 98 are plates each having approximately hexagonal shape viewing from upside, and engaging grooves 96a, 96b, and 96c, which are slidably engaged with guide member 99, are formed on sides opposite the sides connected to plates 93, 94, and 95, respectively. In the state where plate 93, 94, and 95 are mounted on the front mounting part 91 and rear mounting part 92, from the front side to the rear side, first sliding member 96, second sliding member 97, and third sliding member are provided so that they are overlapped with each other.

Furthermore, iron piece IP to be attracted onto electromagnet EM, which will be described later on, is fixed on a portion of front surface 96b of first sliding member 96 amongst three sliding members 96, 97, 98, and electromagnet EM which attracts iron piece by a magnetic force is fixed on a portion of rear surface 98b of third sliding member 98. When iron piece IP is attracted onto electromagnet EM, a friction force is generated between three sliding members 96, 97, 98, and the sliding is regulated by this friction force, to thereby regulate the deformation of three plates 93, 94, and 95. It is noted that electromagnet EM is controlled by controller 5 as described in the first embodiment.

Guide member 99 possesses shaft portion 99a, in which engaging grooves 96a, 97a, and 98a of three sliding members 96, 97, and 98 are engaged, and flange portions 99b and 99c serving as a lock mechanism formed on both ends of shaft portion 99a.

Next, the operation of apparatus M having lateral force generator 9 just mentioned will be described by referring to FIG. 15.

Figure 15A:
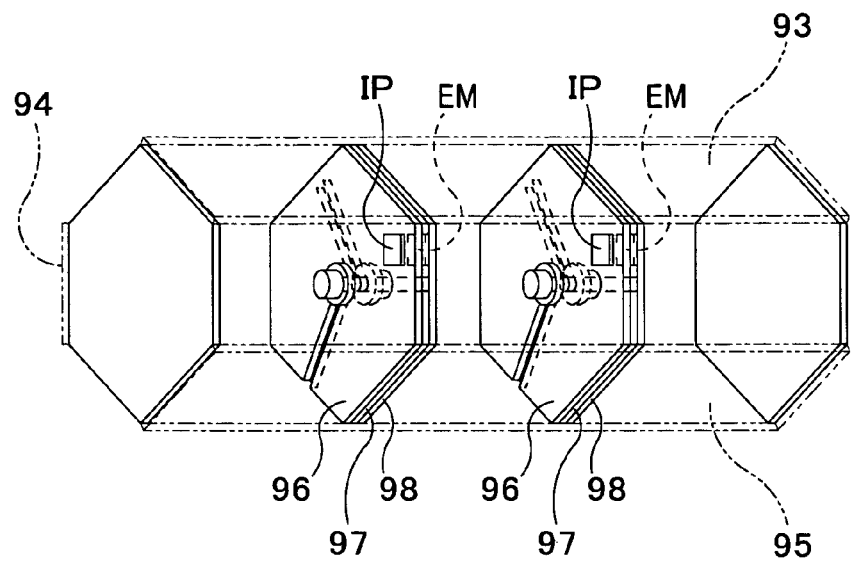
FIG. 15A is a perspective-sectional view showing a lateral force generator according to a fourth embodiment at a normal state.
Figure 15B:
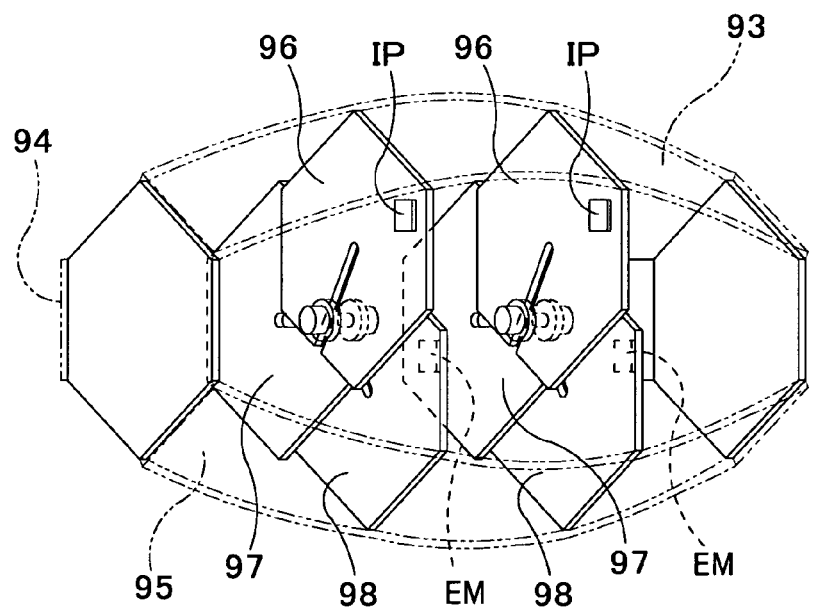
FIG. 15B is a perspective view showing a lateral force generator according to the fourth embodiment at the state of fully lapped collision or at the time of collision with a small subject.

As shown in FIG. 15A, at a normal driving state, since no collision load is inputted to plates 93, 94, 95, three sliding members 96, 97, 98 are maintained at the state where they are overlapped with each other. As shown in FIG. 15B, in the case where the collision is dealt at a low buckling load as in the case of being fully lapped or the case of being collided with a small subject (such as an electric pole or a compact car), controller 5 does not allow current for running through two electromagnets EM, whereby no friction force is generated between three sliding members 96, 97, and 98. In this case, these three sliding members 96, 97, and 98 are slid to meet the deformation of three plates 93, 94, and 95. Specifically, three plates 93, 94, and 95 are buckled in the primary mode with no restriction of three plates 93, 94, and 95 by iron piece IP and electromagnet EM.

Figure 16A:
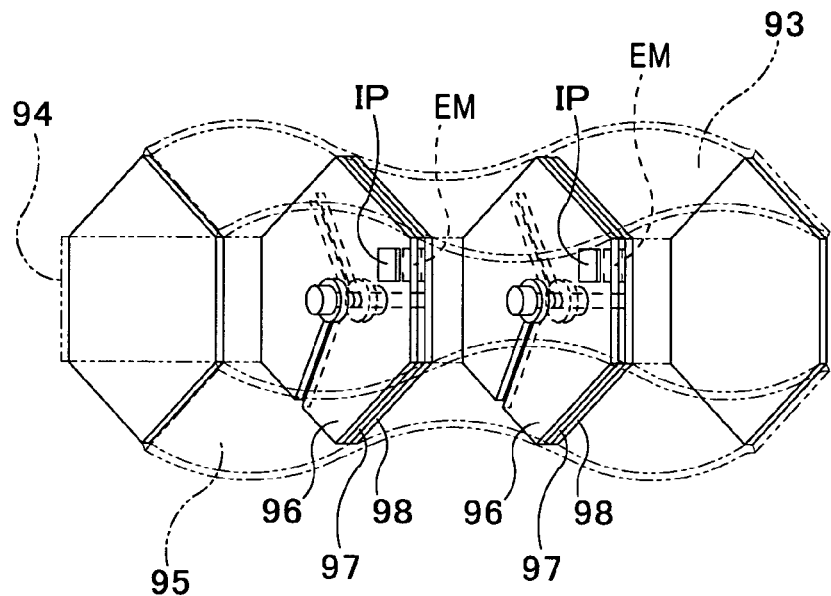
FIG. 16A is a perspective view showing a lateral force generator according to a fourth embodiment at the time of being bucked in a tertiary mode.
Figure 16B:
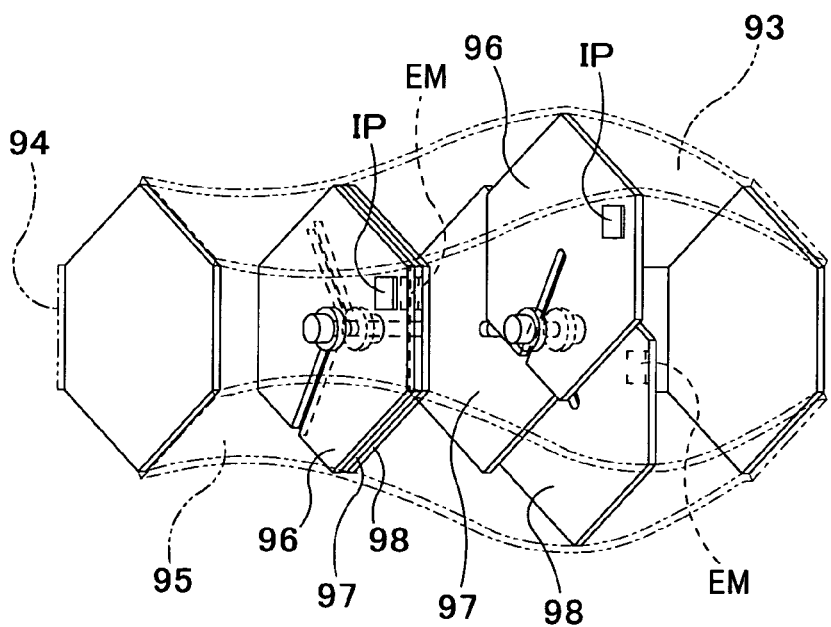
FIG. 16B is a perspective view showing a lateral force generator according to a fourth embodiment at the time of being bucked in a secondary mode.

Also, as shown in FIG. 16A, in the case where a high buckling load is required such as in the case of offset collision or in the case of being collided with a big subject (as in the case where the subject is a large-sized car or such), controller 5 supplies current to two electromagnets EM, EM, whereby iron piece IP is attracted onto electromagnets EM, EM to generate a friction force between three sliding members 96, 97, and 98. In this case, even if three plates 93, 94, and 95 is going to be deformed, sliding members 96, 97, and 98 are not slid and stay in those positions. Specifically, three plates 93, 94, and 95 are restricted by three plates 93, 94, and 95 by iron piece IP and electromagnets EM, EM and is deformed in a tertiary deformation mode. It is noted that when current is supplied to only one of two electromagnet EM, EM, at this time, three plates 93, 94, and 95 are deformed in a secondary deformation mode as shown in FIG. 16B. Specifically, since various types of collision are considered in actual collision, the deformation mode can be switched to a secondary mode or a tertiary mode depending upon a degree of collision load. Also, arrangement of three or more sets each comprising sliding members 96, 97, 98, iron piece IP, and electromagnet EM makes it possible to switch the state of bucking into a forth or higher mode, and makes it possible to set a much higher bucking load.

As described above, the following advantages can be obtained according to the fourth embodiment of the present invention.

Since side frames 2, 2, which are divided into two portions, are connected to three plates 93, 94, and 95, the rigidity at the connected portion can be heightened in comparison with a configuration as in the first embodiment that side frames 2, 2 are connected to two plates 21, 21. Also, since the buckling mode can be freely set from primary to tertiary modes only by controlling the current supplied to electromagnet EM, the rigidity can be switched depending upon all of the collision states. Furthermore, by placing three plates 93, 94, and 94 every another side, they are not interfered with each other at the time of the deformation and, thus, these plates 93, 94, and 94 can be buckled at the deformation mode having been set in an ensured manner.

It should be noted that while iron piece IP is used in the fourth embodiment, the present invention is not restricted thereto, and, for example, a permanent magnet may also be used. In this case, it is desirable to supply a type of current such that the permanent magnet and electromagnet EM are repulsed with each other at the time when plates 93, 94, and 94 are not restricted.

Figure 17:
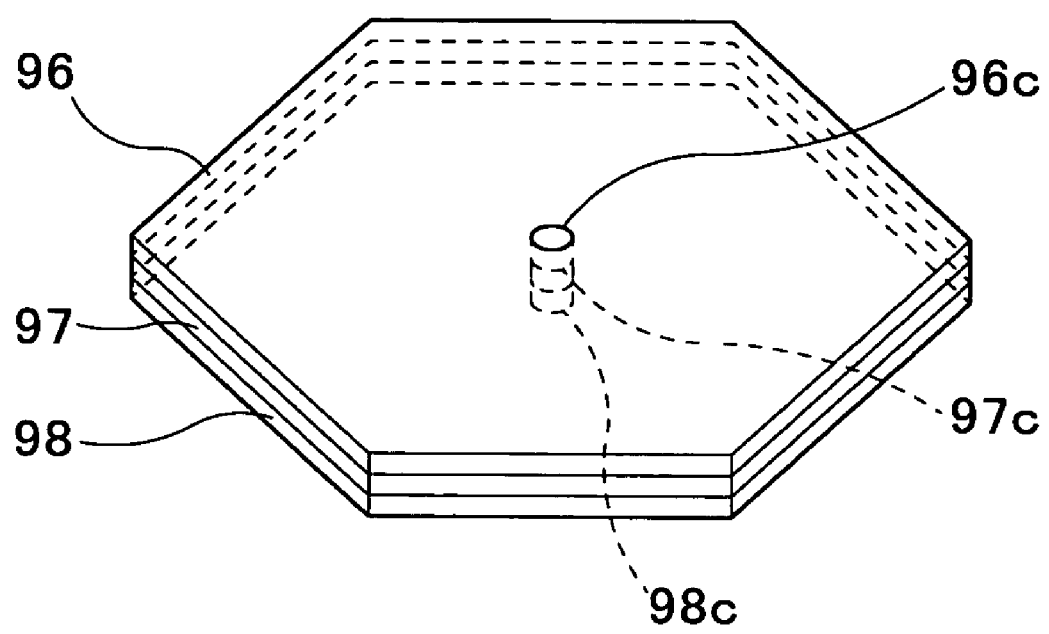
FIG. 17 is a drawing showing one example of a method of restricting sliding members.
Figure 18:
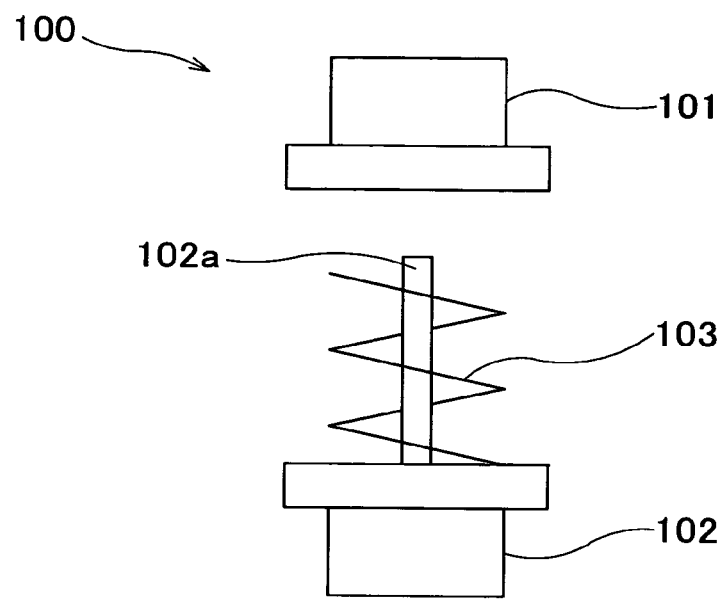
FIG. 18 is a side view showing one embodiment of a restriction mechanism in the fourth embodiment.

As another method for restricting a configuration can be considered that sliding members 96, 97, and 98, pores 96c, 97c, and 98c which pierced through sliding members 96, 97, and 98 are provided as shown in FIG. 17, restriction mechanism 100 as shown in FIG. 18 is mounted. Restriction mechanism 100 is composed of fixing part 101 which is fixed onto sliding member 96, engaging part 102, which is mounted on fixing part 101 in a detachable manner, and coil spring 103, which is provided between these fixing part 101 and engaging part 102.

Figure 19:
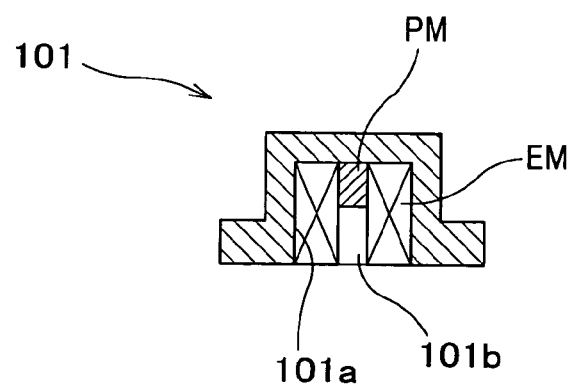
FIG. 19 is a cross-sectional view of the restriction mechanism shown in FIG. 18.

As shown in FIG. 19, concave portion 101a is formed on fixing part 101, and on concave portion 101a are formed electromagnet EM formed as an electromagnetic coil in a substantially cylindrical form and permanent magnet PM, which is provided inside electromagnet EM. When permanent magnet PM is formed shorter than electromagnet EM, pore 101b, which can be engaged with pin 102a, which will be described later, is formed by inner circumferences of permanent magnet PM and electromagnet EM.

As shown in FIG. 18, engaging part 102 possesses pin 102a comprising a magnetic body, which is inserted in pores 96c, 97c, and 98c of sliding members 96, 97, and 98. By attracting pin 102a onto permanent magnet PM at a normal state, coil spring 103 placed around pin 102a always applies a bias force to sliding members 96, 97, and 98.

Subsequently, operation of restriction mechanism 100 will now be described.

Figure 20:
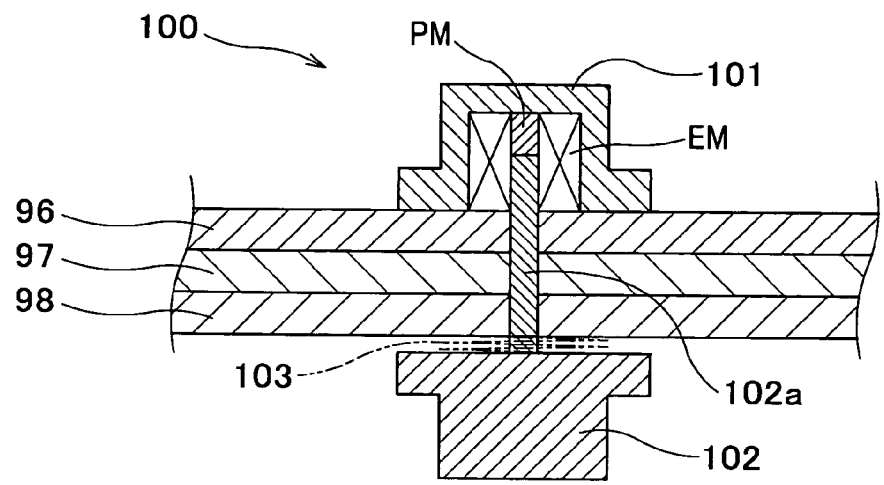
FIG. 20 is a cross-sectional view showing the operation of the restriction mechanism shown in FIG. 18 in the state of being restricted.
Figure 21:
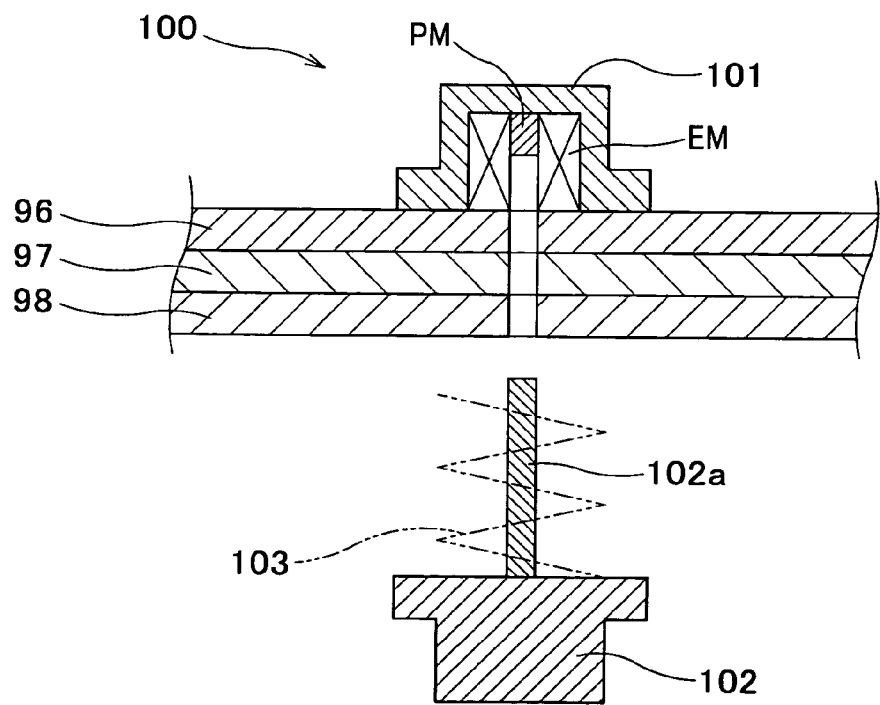
FIG. 21 is a cross-sectional view showing the operation of the restriction mechanism shown in FIG. 18 in the state of not being restricted.

As shown in FIG. 20, at a normal state or when a high buckling load is required, by maintaining the state where pin 102a is attracted onto permanent magnet PM, sliding members 96, 97, and 98 are restricted so as not to be slid by means of pin 102a. In contrast, as shown in FIG. 21, when a low buckling load is required, a magnetic field in a direction reverse to that of permanent magnet PM is generated by electromagnet EM to weaken attraction force between permanent magnet PM and electromagnet EM, whereby coil spring 103 is returned to unlock pin 102a from pores 96c, 97c, and 98c. This results in the state where sliding members 96, 97, and 98 can be slid.

While the embodiments of present invention have been described, the present invention is not restricted to the configurations of the embodiments and various modifications and alternations can be made without departing from the technical ideas and sprits of the present invention.

What is claimed is:

1. An apparatus for controlling the rigidity of a vehicle, the apparatus comprising:
    a controller for controlling a buckling form by applying a lateral force to a member subjected to a collision load,
    wherein the lateral force is applied to the member in a direction substantially perpendicular to a direction of the collision load, and
    wherein the collision load is applied to the vehicle in a direction extending from a first longitudinal end of the vehicle to a second longitudinal end of the vehicle,
    said controller comprising:
        frame restrictors provided on at least one portion of said member in the direction substantially perpendicular to the collision load, and which restrict deformation of said member in the direction substantially perpendicular to the collision load through the lateral force, and
        a restriction regulator which regulates a restriction state of said frame restrictors.

2. The apparatus as claimed in claim 1, further comprising at least one collision detector, wherein the lateral force is controlled based on an evaluation output from the at least one collision detector.

3. The apparatus as claimed in claim 2, wherein the controller is provided between an upper wall of the member and a lower wall of the member, and wherein the member is a bumper.

4. The apparatus as claimed in claim 2, wherein the at least one collision detector comprises a distance sensor that is usable with at least one of a speed sensor and a CCD camera.

5. The apparatus as claimed in claim 2, wherein the at least one collision detector comprises a plurality of distance sensors provided on the bumper.

6. The apparatus as claimed in claim 1, wherein the buckling of the member occurs in a primary deformation mode and a secondary deformation mode, and wherein a ratio of a length L of the member to a thickness t of the member L/t is set so that a difference between a buckling load during the primary deformation mode and a buckling load during the secondary deformation mode is substantially equal to a predetermined value.

7. An apparatus for controlling the rigidity of a vehicle body, the apparatus comprising:
    a side frame member of the vehicle body;
    a lateral force generator which controls buckling of an intermediate member disposed on the side frame member and which applies a lateral force to a collision load to be applied to said intermediate member disposed on the side frame member,
    wherein the collision load is applied in a direction of a longitudinal axis of the side frame member, which is parallel to a longitudinal axis of the vehicle body, and
    wherein the lateral force is applied in a direction substantially perpendicular to the longitudinal axis of the side frame member; and
    at least one collision detector,
    wherein the lateral force is controlled based on an evaluation output from the at least one collision detector, and
    wherein the at least one collision detector comprises a plurality of distance sensors provided on the bumper.

8. The apparatus as claimed in claim 7, wherein the intermediate member comprises a hollow frame member, and the lateral force generator comprises a frame restrictor provided on at least one end portion of the hollow frame member and which restricts deformation of the hollow frame member through the lateral force, and a restriction regulator which regulates the restriction state of the frame restrictor.

9. The apparatus as claimed in claim 7, wherein the lateral force generator is disposed within the intermediate member.

10. The apparatus as claimed in claim 7, wherein the at least one collision detector comprises a distance sensor that is usable with at least one of a speed sensor and a CCD camera.

11. The apparatus as claimed in claim 7, wherein the buckling of the intermediate member occurs in a primary deformation mode and a secondary deformation mode, and wherein a ratio of a length L of the intermediate member to a thickness t of the intermediate member L/t is set so that a difference between a buckling load during the primary deformation mode and a buckling load during the secondary deformation mode is substantially equal to a predetermined value.

12. An apparatus for controlling the rigidity of a vehicle body, the apparatus comprising:
- a side frame member of the vehicle body, the side frame member having a first side frame member portion and a second side frame member portion,
- a lateral force generator which controls buckling of the side frame member by applying a lateral force to a collision load to be applied to an intermediate member disposed directly between opposing end faces of the first and second side frame member portions,
- wherein the collision load is applied in a direction of a longitudinal axis of the side frame member, which is parallel to a longitudinal axis of the vehicle body, and
- wherein the lateral force is added in a direction substantially perpendicular to the longitudinal axis of the side frame member.

13. The apparatus as claimed in claim 12, wherein the intermediate member comprises a hollow frame member, and the lateral force generator comprises a frame restrictor provided on at least one intermediate portion of the hollow frame member and which restricts deformation of the hollow frame member through the lateral force, and a restriction regulator which regulates the restriction state of the frame restrictor.

* * * * *